April 23, 1963 R. D. BUCK 3,087,142

BINARY DATA TRANSFER APPARATUS

Filed March 16, 1960 2 Sheets-Sheet 1

INVENTOR
ROBERT D. BUCK
BY Edgar H. Kent
ATTORNEY

April 23, 1963 R. D. BUCK 3,087,142

BINARY DATA TRANSFER APPARATUS

Filed March 16, 1960 2 Sheets-Sheet 2

United States Patent Office
3,087,142
Patented Apr. 23, 1963

3,087,142
BINARY DATA TRANSFER APPARATUS
Robert D. Buck, Saugerties, N.Y., assignor to International Business Machines Corporation, New York, N.Y., a corporation of New York
Filed Mar. 16, 1960, Ser. No. 15,237
7 Claims. (Cl. 340—147)

Figure 1:
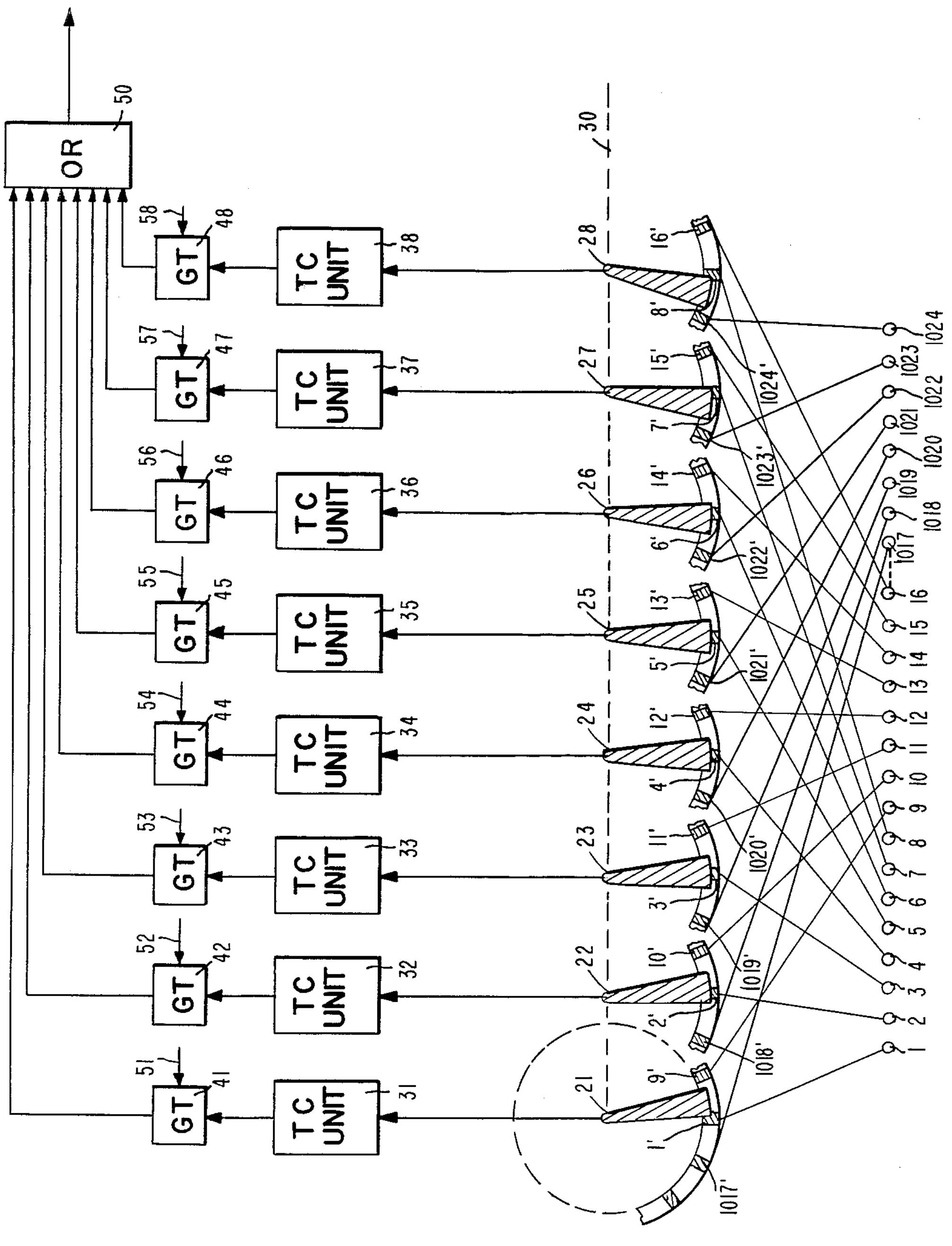

This invention relates generally to electronic computing machines, and in particular it is concerned with the sampling of numerous sources of data which is to be assimilated by such machines.

Data may be supplied to computing machines from multiple sources which require reading periods to sense the data that are much longer than the time needed by the computer to assimilate the sensed data in serial form. Consequently, if the computer must wait for successive sensing of such sources for its data supply, its operation may be slowed and its efficiency undesirably reduced.

The primary object of the present invention is to provide a system for sampling data from multiple sources of this type and to supply the sampled data as input data to an electronic computer in a time interval much shorter than the aggregate of the sensing periods for each source. Other objects are to provide a high speed sampling system for such data which is highly reliable yet economical in the use of equipment to implement it.

In brief, the system of the present invention makes use of a number of commutator type selector switches which are driven in synchronism. Each of the switches serves to select successive ones of a corresponding group of data signal sources for connection to a threshold comparator unit. The output of each comparator in turn is applied to a gate which is conditioned to pass a signal from the comparator to a computer only for a very brief interval representing but a fraction of the time during which the comparator is connected to a signal source. In this way each of the comparators is adapted to be momentarily coupled to the computer once during each step of the commutator switches.

The novel features of the invention together with further objects and advantages thereof will become apparent from the following detailed description and the drawing to which it refers.

Figure 2:
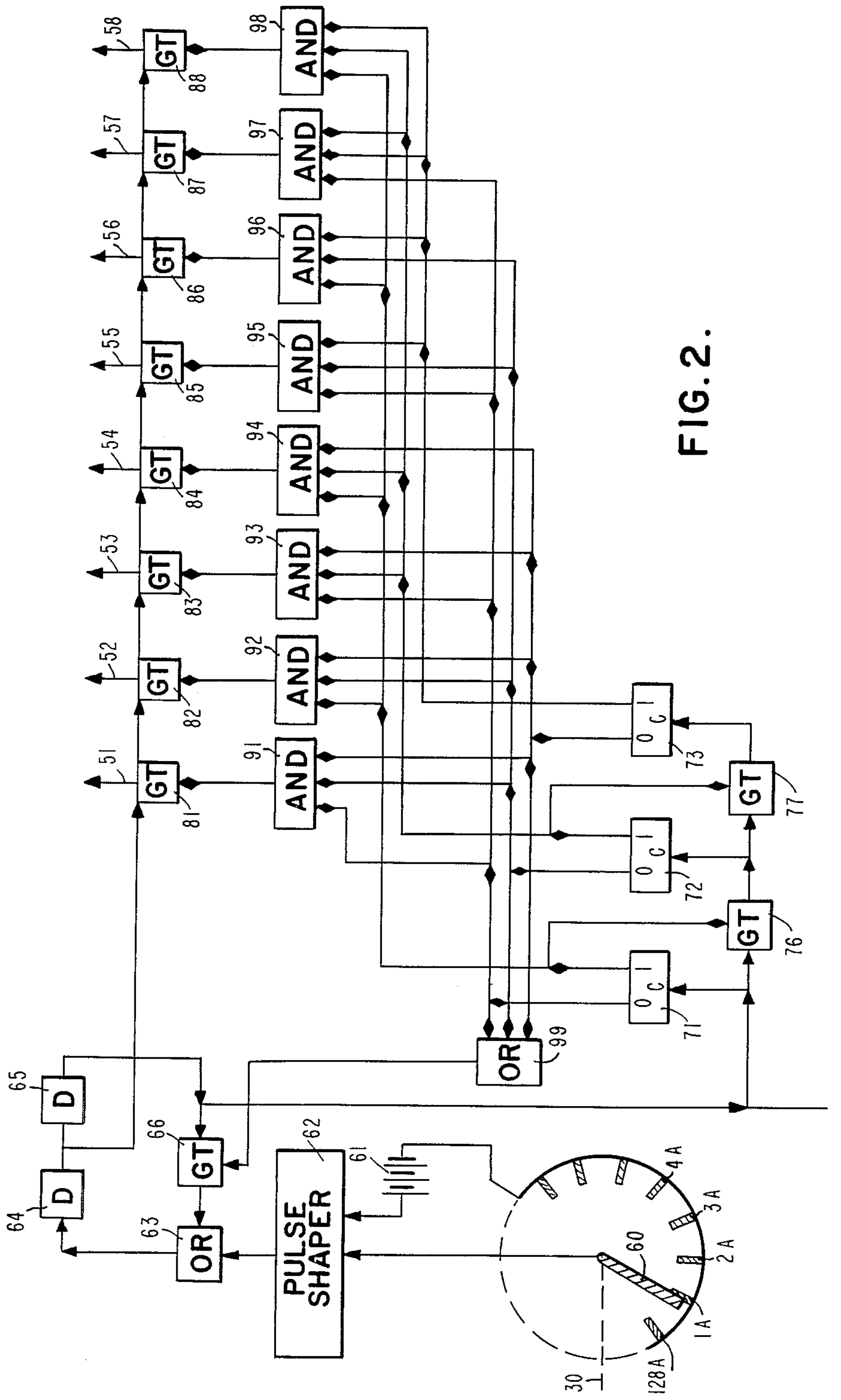

In the drawing:

FIG. 1 is a block diagram illustrating the switching logic of the system according to the present invention, and FIG. 2 is a block diagram illustrating the timing logic of the system.

With reference first to FIG. 1 it will be observed that the illustrated embodiment of the invention contemplates the transfer of data from 1024 separate signal sources represented by terminals 1—16 and 1017—1024 in the drawing. Not shown are terminals 17—1016 in order to simplify the drawing and make it easier to understand the underlying principles of the invention. Connected to each of the terminals is a corresponding switch contact of like number with a prime added. These contacts, which are accordingly numbered 1′—16′ and 1017′—1024′, together with movable arms 21—28, comprise a group of eight commutator type selector switches driven from a commutator shaft indicated diagramatically at 30. Specifically, a first of these selector switches includes contacts 1′, 9′, 1017′ and arm 21; a second of these switches includes contacts 2′, 10′, 1018′ and arm 22, and so forth. The effective arcuate dimensions of the arms are seen to be slightly less than the spacing between adjacent contacts on the switches. The significance of this fact and the fact that the respective arms exhibit a progressive shift in angular position will be explained in detail hereinafter.

Connected to the respective movable arms of the switches are threshold comparator units 31—38 and connected to the output sides of the comparator units are pulse gates 41—48. The comparator units 31—38 serve to re-transmit data signals if the magnitudes of the signals exceed a predetermined amount. Units of this kind are well known and are available commercially. They may comprise conventional trigger circuits, for example. The pulse gates serve to pass the re-transmitted signals one after another to an OR circuit 50 in response to sequential pulse signals on lines 51—58. The nature of these pulse signals and the manner in which they are produced will be described in detail in connection with FIG. 2.

With reference now to FIG. 2 it will be observed that in addition to the selector switches shown in FIG. 1, the commutator shaft 30 drives a synchronized switch arm 60. Switch arm 60 cooperates with stationary contacts 1A—128A to produce synchronizing pulses of current from a battery 61, it being understood that the battery is merely illustrative of an energy source. The synchronizing pulses, in turn, are applied to a delay unit 64 by way of a pulse shaping circuit 62 and a logical OR circuit 63. The output side of delay unit 64 is connected to a similar delay unit 65 which has its output side coupled to both the aforementioned OR circuit 63, through a gate 66, and to a scale of eight counting circuit.

The counting circuit is seen to comprise a pair of gates 76, 77 and flip-flops 71—73 having complementing inputs and ONE and ZERO outputs. Incoming pulses from delay unit 65 are applied to the complementing input of flip-flop 71 and to the gate 76. Gate 76 is conditioned by the one side of flip-flop 71 to pass on the pulse to the complementing input of flip-flop 72 and to the input of gate 77. Gate 77, in turn, passes the pulse to flip-flop 73 whenever the gate is conditioned by the one side of flip-flop 72.

The count carried by the flip-flops is used to condition sequentially a group of eight gates 81—88. To this end, a group of eight logical AND circuits 91—98 is provided, each of which has three inputs served by a unique combination of outputs from the flip-flops. For example AND circuit 91 has its inputs connected to the ZERO sides of the flip-flops; AND circuit 92 has its inputs connected to the ONE side of the flip-flop 71 and to the ZERO sides of flip-flops 72 and 73, and so forth. The outputs of the respective AND circuits serve to condition the gates 81—88 which, as shown, are sensed by pulses from delay unit 64. Completing the timing arrangement of FIG. 2 is a logical OR circuit 99 which is served with conditioning levels for the gate 66 by the ZERO sides of flips-flops 71—73.

In operation the amount of delay introduced by elements 64 and 65 is approximately equivalent to one-eighth of the period between pulses from the synchronizer switch. Consequently, each switch pulse is fed back by way of gate circuit 66 and caused to reappear at the output of element 65 seven times before the occurrence of the next switch pulse. Upon the occurrence of an original switch pulse and seven such following pulses, all of the flip-flops are placed in a ONE state representing a full count. In consequence, gate 66 becomes deconditioned so that the next group of eight such pulses will be initiated by the action of the synchronizer switch alone.

As should by now be apparent, the object of this arrangement is the provision of synchronized timing pulses which have a repetition rate eight times as fast as that of the switch pulses. These timing pulses sense gates 81—88 which, as aforementioned, are sequentially conditioned by the AND circuits 91—98 according to the count in the flip-flops. Gates 81—88 are thus adapted to serve as separate sources of timing pulses, each gate providing one pulse in every group of eight that occurs.

With reference now once again to FIG. 1, it will be observed that the respective switch arms 21—28 are in registry with contacts 1'–8' to which terminals 1—8 are connected. However, it will also be observed that switch arm 21 is about to break with contact 1', whereas switch arm 28 has just begun to make with contact 8', the other switch arms 22—28 assuming graduated angular positions in between. Thus, if it be assumed that a signal has been caused to appear at each of the first eight terminals, all of the threshold comparator units will have signals applied to them during successive intervals that overlap one another. The signals from the threshold comparators, however, are gated out during successive intervals that are distinct. In particular, with the contact arms in the positions shown, gate 41 is the first gate to be sensed because arm 21 is just completing its period of contact during which corresponding comparator unit 31 is receiving the incoming signal. When arm 22 arrives at a position corresponding to that shown for arm 21, gate 42 is the next to be sensed and so forth. It follows that before each of the gates is opened to pass a signal from a threshold comparator unit, the latter will have been connected to one of the source terminals for the full period of contact of the selector switch arms. Since it is contemplated that the system of the invention will be used with data signals of varying amplitude characteristics and that only those signals whose amplitudes exceed a predetermined level will be passed by the comparator units, this period of contact is extremely significant for without it the comparator units could not properly react to the data signals. There is no such restriction on the output signals from the comparator units themselves, however, because these are all of uniform amplitude sufficient to be readily recognizable by a computer or other utilization device. According to the invention, therefore, data signals can be made available to a cumputer successively at a much faster rate than the aggregate time provided for deriving the signals from the terminals of the individual sources, using but relatively little data transfer equipment. If instead, commutator type switching were employed throughout, the rate of data transfer would have to be much lower.

While a single preferred embodiment of the invention has been shown and described herein, various modifications thereof will be obvious to those skilled in the art and it will be understood that the invention is not intended to be limited thereto or to details thereof and departures may be made therefrom within the spirit and scope of the invention as defined in the claims.

What is claimed is:

1. A high speed sampling system for sampling parallel input data signals applied on a multiplicity of input lines and translating those applied input data signals which meet a pre-established criterion in sequence into an output circuit, comprising a predetemined number of electromechanical selector switches, said predetermined number being smaller than the number of input lines, each said selector switch having a corresponding plurality of first contacts and a second contact movable relative to said first contacts to make and break circuit with said first contacts in sequence, a sampling signal generator including a switch component having a plurality of contact members corresponding in number to the number of said first contacts on each of said selector switches and correspondingly positioned on said switch component, and a cooperating contact member movable relative to said contact members to sequentially make and break circuit with said contact members to produce sampling signals, said switch component and said selector switches being ganged so that said cooperating contact member and all of said second contacts are moved relative to their associated contact members and first contacts at the same time and at the same rate, each of said input lines being connected to a different one of said first contacts, a signal discriminator circuit connected to each said second contact and adapted to produce an output signal whenever the signal applied to said discriminator circuit from the connected second contact meets said pre-established criterion, a gate connected to each said discriminator circuit for controlling the transmission of output signals from said discriminator circuit to said output circuit, means to apply gate sampling signals from said sampling signal generator to said gates in sequence, and a driver for moving said second contacts and said cooperating contact member relative to said first contacts and said contact members in unison.

2. A sampling system as claimed in claim 1 wherein said selector switches are continuously driven and said first contacts are stationary contacts and said second contacts are movable contacts which dwell on said stationary contacts during overlapping intervals of time to apply said input data signals to the associated discriminator circuit during said overlapping intervals of time.

3. A sampling system as claimed in claim 2 wherein said sampling pulse generator further includes an oscillatory device to produce timing pulses, means responsive to said sampling signals to synchronize the operation of said device with the speed of operation of said switches, and means to count timing pulses produced by said device, and wherein said means to apply gate sampling signals is operative in accordance with the count held by said counting means.

4. A sampling system for parallel data signals comprising a group of continuously operable selector switches, each of said switches having a plurality of angularly spaced stationary contacts and at least one relatively movable contact which dwells on successive ones of said stationary contacts for equal time intervals, said switches having their movable contacts disposed in relatively different angular positions, said positions differing uniformly from switch to switch by an amount corresponding to equal fractions of an interval, a corresponding group of threshold comparator units to produce output signals when the amplitudes of the applied data signals exceed a predetermined amplitude, said data signals being successively applied to said comparator units by means of said switches, a corresponding group of gate circuits selectively to pass the output signals produced by said comparison devices, switch means mechanically coupled to said switches to generate a train of synchronizing pulses, oscillatory apparatus to generate a train of timing pulses, the repetition rate of said timing pulses being synchronized with the speed of said switches by means of said synchronizing pulses, and means individually to apply the timing pulses to said gate circuits in a predetermined sequence.

5. A high speed sampling system for sampling parallel input data signals applied on a multiplicity of input lines and translating those applied input data signals which meet a pre-established criterion in sequence into an output circuit, comprising a predetermined number of electromechanical selector switches, said predetermined number being smaller than the number of input lines, each said selector switch having a corresponding plurality of angularly spaced stationary first contacts and a continuously movable second contact which makes and breaks circuit with said stationary contacts in sequence, and dwells on successive ones of said stationary contacts for equal time intervals, a sampling signal generator including a switch component having a plurality of stationary contact members corresponding in number to the number of said first contacts on each of said selector switches and correspondingly angularly positioned on said switch component, and a continuously movable cooperating contact member which sequentially makes and breaks circuit with said contact members to produce sampling signals, said switch component and said selector switches being ganged so that said cooperating contact member and all of said second contacts are moved relative to their associated contact members and first contacts at the same time and at the same rate, each of said input lines being connected to a different one of said first contacts, a signal discriminator circuit connected to each said second contact and adapted to produce an output signal whenever the signal applied to said discriminator circuit from the connected second contact meets said pre-established criterion, a gate connected to each said discriminator circuit for controlling the transmission of output signals from said discriminator circuit to said output circuit, means to apply gate sampling signals from said sampling signal generator to said gates in sequence, and a driver for continuously moving said movable contacts and said cooperating contact member relative to said stationary contacts and said stationary contact members in unison.

6. A high speed data signal input system for translating parallel input data signals applied on a multiplicity of input lines into an output circuit, comprising a predetermined number of electromechanical selector switches, said predetermined number being smaller than the number of input lines, each said selector switch having a corresponding plurality of first contacts and a second contact movable relative to said first contacts to make and break circuit with said first contacts in sequence, a sampling signal generator including a switch component having a plurality of contact members corresponding in number to the number of said first contacts on each of said selector switches and correspondingly positioned on said switch component, and a cooperating contact member movable relative to said contact members to sequentially make and break circuit with said contact members to produce sampling signals, said switch component and said selector switches being ganged so that said cooperating contact member and all of said second contacts are moved relative to their associated contact members and first contacts at the same time and at the same rate, each of said input lines being connected to a different one of said first contacts, a gate associated with each said second contact and responsive to input signals on the associated second contact for controlling the transmission of signals from said associated second contact to said output circuit, means to apply gate sampling signals from said sampling signal generator to said gates in sequence, and a driver for moving said second contacts and said cooperating contact member relative to said first contacts and said contact members in unison.

7. The system as claimed in claim 6 wherein said sampling signal generator further includes oscillatory apparatus to generate a train of pulses in response to each sampling signal from said cooperating contact member, the number of pulses in each said train being equal to said predetermined number, and counter means operative to distribute the pulses in each train for application to said gates in sequence.

References Cited in the file of this patent

UNITED STATES PATENTS 2,899,567 Romano -------------- Aug. 11, 1959